(12) United States Patent
Ibrahim et al.

(10) Patent No.: US 6,269,306 B1
(45) Date of Patent: Jul. 31, 2001

(54) SYSTEM AND METHOD FOR ESTIMATING SENSOR ERRORS

(75) Inventors: Faroog Ibrahim, Dearborn; Thomas Edward Pilutti, Ann Arbor, both of MI (US)

(73) Assignee: Ford Global Tech., Dearborn, MI (US)

( * ) Notice: Subject to any disclaimer, the term of this patent is extended or adjusted under 35 U.S.C. 154(b) by 0 days.

(21) Appl. No.: 09/592,709

(22) Filed: Jun. 13, 2000

(51) Int. Cl.$^7$ .................................................. G01C 17/38
(52) U.S. Cl. ............................ 701/214; 701/220; 701/221
(58) Field of Search ............................... 701/27, 26, 213, 701/214, 215, 220, 221; 706/15, 16, 22, 43, 900

(56) References Cited

U.S. PATENT DOCUMENTS

| | | |
|---|---|---|
| 5,339,246 | 8/1994 | Kao . |
| 5,343,208 * | 8/1994 | Chesleg ................................ 342/196 |
| 5,416,712 | 5/1995 | Geier et al. . |
| 5,527,003 | 6/1996 | Diesel et al. . |
| 5,588,090 * | 12/1996 | Furuta et al. ............................ 395/23 |
| 5,745,655 * | 4/1998 | Chung et al. ............................ 395/24 |
| 5,875,284 * | 2/1999 | Watanabe et al. ...................... 395/11 |

* cited by examiner

*Primary Examiner*—Richard M. Camby
(74) *Attorney, Agent, or Firm*—Ford Global Tech.

(57) ABSTRACT

A system 10 for estimating sensor error. In the preferred embodiment, the system 10 includes a module 12 and a linear neuron 14, and is adapted to accurately estimate scale factor and bias error of a yaw rate sensor within an integrated navigation system.

19 Claims, 6 Drawing Sheets

SYSTEM AND METHOD FOR ESTIMATING SENSOR ERRORS

FIELD OF THE INVENTION

This invention relates to a system and a method for estimating sensor errors and more particularly, to a system and a method which accurately estimates errors within an integrated navigation system, such as scale factor and bias errors.

BACKGROUND OF THE INVENTION

Integrated navigation systems ("INS") are employed within vehicles in order to provide vehicle position and velocity information with respect to a specified reference frame. A typical INS determines estimates for the position and velocity of a vehicle based on a collection of data taken from inertial sensors such as acceleration and rate sensors mounted in the vehicle, as well as sensors based outside the vehicle such as a global position system ("GPS"). Typically, the INS will use this sensor information, along with a model of vehicle motion behavior to form a set of navigation equations, in order to estimate vehicle position information and derivatives. Conventional INS may be used in "turn-by-turn navigation" systems, within "in vehicle dynamics" systems, and within proposed vehicle enhancements such as "adaptive cruise control."

A key element and/or function of the INS is the estimation of sensor errors used in the navigation equations. All sensors used by the INS have a scale factor that relates the sensor output to the sensed attribute, and a bias error (i.e., the sensor has a nonzero output even when the sensed attribute is zero). If the bias error or scale factor estimates are calculated incorrectly, the calculated vehicle position, heading and/or speed will be in error, and the reliability of the INS will be undesirably reduced. This sensor error estimation is especially important in situations where data from the GPS may become unavailable (e.g., under bridges or within tunnels).

Efforts have been made to reduce the impact of the scale factor and bias error estimation through the use of high quality inertial measurement equipment. However, the relatively high cost of such equipment is prohibitive for automotive applications. Hence, sensor error estimation is critical in conventional systems utilizing lower quality sensors.

Conventional sensor error estimation is typically performed by developing sensor error models, and then implementing the model parameter estimation as augmented equations in the overall set of navigation equations, usually in a "Kalman" filter. The Kalman filter approach has desirable stability properties, but is somewhat limited, as it provides only statistical representations of errors, and requires the implementation to be added to the overall navigation equations. Other attempts at estimating these types of sensor errors have been made using neural networks. While neural networks have the advantage of learning in the presence of noise, they often require a relatively large number of learning examples (e.g., a training set) which are needed for the training phase. The required "training" process is relatively complicated, time consuming and computationally intensive, and is therefore not suited to be carried out "on-line" or during the normal use of a vehicle.

Applicants' invention addresses these drawbacks and provides a method for accurately estimating sensor errors within an integrated navigation system such as scale factor and sensor bias errors.

SUMMARY OF THE INVENTION

It is a first object of the invention to provide a system and a method for estimating sensor errors which overcomes at least some of the previously delineated drawbacks of prior systems, devices, and/or methods.

It is a second object of the invention to provide a system and a method for estimating sensor errors which is adapted for use within an integrated navigation system.

It is a third object of the invention to provide a system and a method for estimating sensor errors by integrating an INS and a GPS using a linear neuron. The linear neuron adaptively estimates scale factor and bias errors in a yaw rate sensor during the availability of the GPS, and then uses these estimated values to aid the INS during periods of time in which the GPS is unavailable or unsuitable for use. The linear neuron used by the present system and method avoids parameter identification disadvantages and extensive training requirements inherent in neural networks. The present system and method further reduce problems associated with persistent excitation inherent in prior "Kalman" filter type estimations.

According to one aspect of the present invention, a system is provided for estimating errors in a first sensor. The system includes a module which is communicatively coupled to the first sensor and to a second sensor, and which includes a first portion which selectively generates a first value based upon a signal received from the first sensor, a second portion which selectively generates a second value based upon a signal from the second sensor, and a third portion which combines the first and second value, effective to generate a third value. The system further includes a linear neuron which is communicatively coupled to the module and which receives the first value and the third value, and which estimates the errors within the first sensor based upon the received first and third values.

According to a second aspect of the present invention, a system is provided for estimating a scale factor and bias error of a yaw rate sensor which is used within an integrated navigation system having a global position system sensor. The system includes a first portion which receives a first signal from the global position system sensor and calculates a global position system heading angle based upon the first signal; a second portion which receives an integrated navigation system heading angle; a third portion which combines the global position system heading angle and the integrated navigation system heading angle, effective to generate a combined heading angle; and a linear neuron which is communicatively coupled to the third portion, which receives the integrated navigation system heading angle and the combined heading angle and which is effective to accurately estimate the scale factor and the bias error based upon the received integrated navigation system heading angle and combined heading angle.

Further objects, features, and advantages of the invention will become apparent from the following detailed description of the preferred embodiment of the invention and by reference to the following drawings.

DETAILED DESCRIPTION OF THE PREFERRED EMBODIMENT OF THE INVENTION

Figure 1:
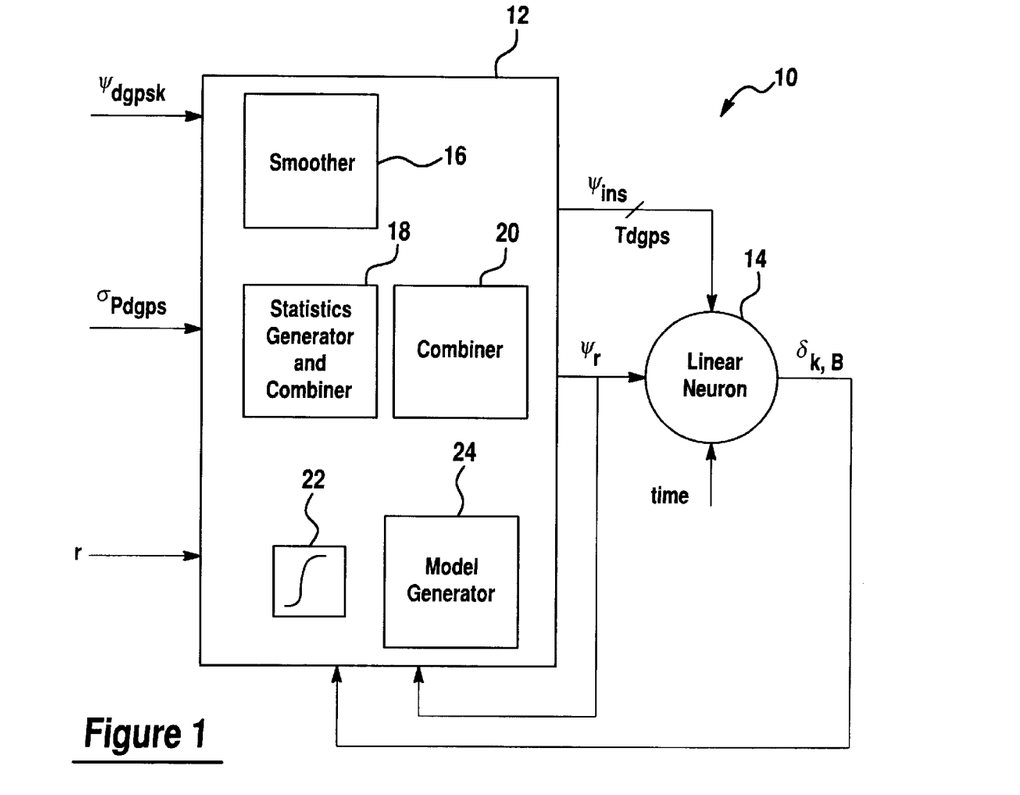
FIG. 1 is a block diagram of a system for estimating sensor errors which is made in accordance with the teachings of the preferred embodiment of the invention.

Referring now to FIG. 1, there is shown a block diagram of a system 10 for estimating sensor errors which is made in accordance with the teachings of the preferred embodiment of the invention. In the preferred embodiment of the invention, system 10 is utilized by a vehicle integrated navigation system ("INS") to estimate sensor errors (i.e., scale factor and bias error of a yaw rate sensor) and to more accurately predict the error in the heading angle determined by the INS. In the preferred embodiment of the invention, system 10 comprises a portion of the entire INS. In alternate embodiments, system 10 can be used to accurately estimate and/or determine errors in other types of sensors and systems which measure different types of attributes and generate signals corresponding to the measured attributes.

As shown, system 10 includes a system module 12 and a linear neuron 14 which is communicatively coupled to the module 12 in a conventional manner. As should also be apparent to those of ordinary skill in the art, module 12 may include one or more memory units and may actually comprise a plurality of commercially available, conventional, and disparate chips or devices, which are operatively and communicatively linked in a cooperative manner. As shown in FIG. 1, module 12 includes several portions 16, 18, 20, 22 and 24 which perform functions related to the operation of the preferred embodiment of the present invention, as described more fully and completely below.

System module 12 is electrically, physically, and communicatively coupled to various sensors (not shown) which provide input signals to module 12 and/or to other portions of the INS. For example and without limitation, module 12 receives a digital global position system ("DGPS") signal from a DGPS sensor (not shown) which provides and/or is used to calculate a DPGS heading angle "$\psi_{dgpsk}$"; and a yaw rate signal "r" from a conventional vehicle yaw rate sensor (not shown). Module 12 further receives and/or calculates the standard deviation of the DPGS measured position "$\sigma_{Pdgps}$".

As described more fully and completely below, module 12 "smoothes" the DGPS heading angle $\psi_{dgpsk}$ by use of a simple variable-coefficient filter. The smoothed DGPS heading angle $\psi_{dgpsk}$ is then combined with the INS heading angle "$\psi_{ins}$", which is provided and/or determined in a conventional manner, based on the statistics of both angles and the angle differences. The combined angle "$\psi_f$" is then communicated or "fed" to the linear neuron 14 along with open loop INS angle $\psi_{ins}$ in order to estimate the scale factor "$\delta_k$" and the bias "B" of the yaw rate sensor. The estimated scale factor $\delta_k$ and bias B are the communicated or "fed back" into module 12 in order to generate the statistics of the INS heading angle $\psi_{ins}$ for the next time sample.

Using the linear neuron 14 to estimate the bias and the scale factor in the yaw rate sensor requires a desired target of the heading angle error with an acceptable accuracy. The following description discloses a non-limiting method of obtaining a good estimate of the heading angle from both the received DGPS positions and the INS heading angle.

Figure 2:
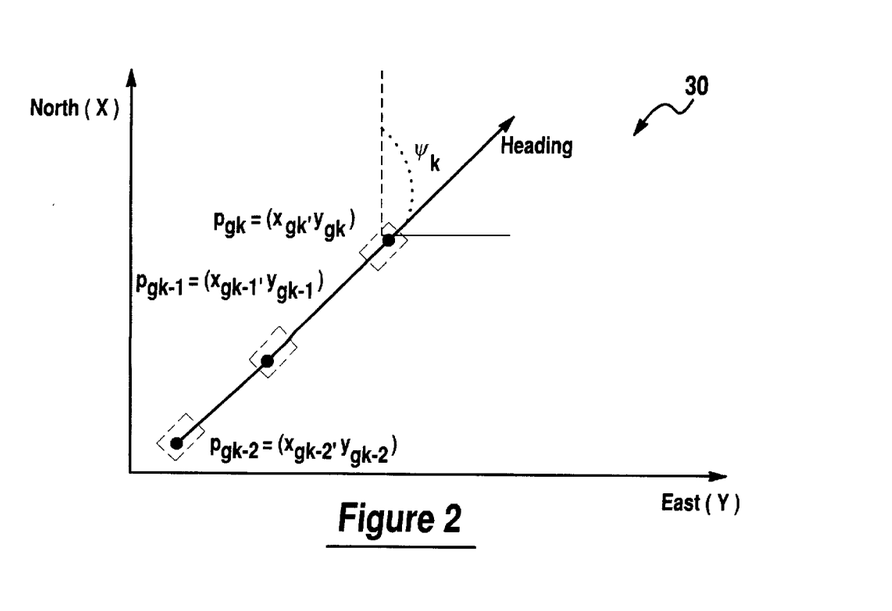
FIG. 2 is a graph illustrating a determination and/or calculation of a DGPS heading angle by using position signal data received from a DPGS sensor.

The first step in the implementation of the proposed system is to obtain the DGPS heading angle $\psi_{dgpsk}$, and then smooth it in order to overcome "jittering" and "outlier" effects. In the preferred embodiment of the invention, a conventional variable-coefficient filter or "smoother" 16 is applied to the DGPS signal for this purpose. Referring now to FIG. 2, there is shown a graph 30 illustrating the determination and/or calculation of the DGPS heading angle $\psi_k$ (e.g., $\psi_{dgpsk}$) by using position signal data received from the DPGS sensor at events k and k−1 (e.g., positions $P_{gk}$ and $P_{gk-1}$).

The heading angle $\psi_k$ (e.g., $\psi_{dgpsk}$), measured clockwise from the "Y" axis, at time $t_k$ can be written as $$\psi_k = a\tan 2(y_{gk}-y_{gk-1}, x_{gk}-x_{gk-1}), \quad \text{(Eq. 1)}$$

where atan2 is the four quadrant inverse tangent. The "smoothed" average heading angle $\psi_{ks}$, at time $t_k$ is the weighted average of the heading angles at times $t_k$ and $t_{k-1}$, which may be represented by the following equation:

$$\psi_{ks} = \left( \frac{\frac{W_1}{1+|S|}\psi_{k-1s} + W_2\psi_k}{\frac{W_1}{1+|S|} + W_2} \right) \quad \text{(Eq. 2)}$$

where S is the sum of the yaw rates between the current and last DGPS positions. In this non-limiting embodiment, the yaw rate is being measured at a faster rate than the DGPS measurement rate. Furthermore, in this non-limiting example, $W_2$ is selected to be greater than $W_1$ to give more weight to $\psi_k$, and as $|S|$ increases, even less weight is assigned to $\psi_{k-1}$. In the preferred embodiment of the invention, the calculated heading angle $\psi_k$ is required to pass a "smoothness test" before it is used within Eq. 2. If the calculated heading angle $\psi_k$ fails to pass the smoothness test, the filter begins a new phase of the filtering process.

The smoothness test is based on the value of S and the expected range of the yaw rate measurements. That is, the change in the DGPS-measured heading angle between the k and k−1 DGPS positions (i.e., $\psi_k - \psi_{k-1}$) should be relatively close in value to the accurate value of S if $P_k$ is not an outlier with respect to the DGPS filtered path. Hence, if S is greater than the expected range of its error, the sign of $(\psi_k - \psi_{k-1})$ should be the same as the sign of S. Therefore, setting the INS sample period to $dt_i$ and the DGPS sample period to $dt_g$, $\psi_k$ should satisfy the following equation:

$$\psi_{k-1s} + Sdt_i - 2^*\Delta \leq \psi_k \leq \psi_{k-1s} + Sdt_i + 2^*\Delta \quad \text{(Eq. 3)}$$

where $\Delta$ is the expected net error of the yaw rate measurements over the time period $dt_g$. It should be appreciated that by using the "$2^*\Delta$" term, any possible error in this net expected value should be overcome.

Module 12 utilizes a statistics generator and combiner portion 18 to derive statistics for the DGPS heading angle $\psi_{dgpsk}$ which are necessary to statistically combine the DGPS heading angle with the INS heading angle $\psi_{ins}$. Given the k and k−1 position statistics and the radial distance between the two positions, geometry-based heading angle statistics can be derived, as shown by the graph 40 in FIG. 3.

Figure 3:
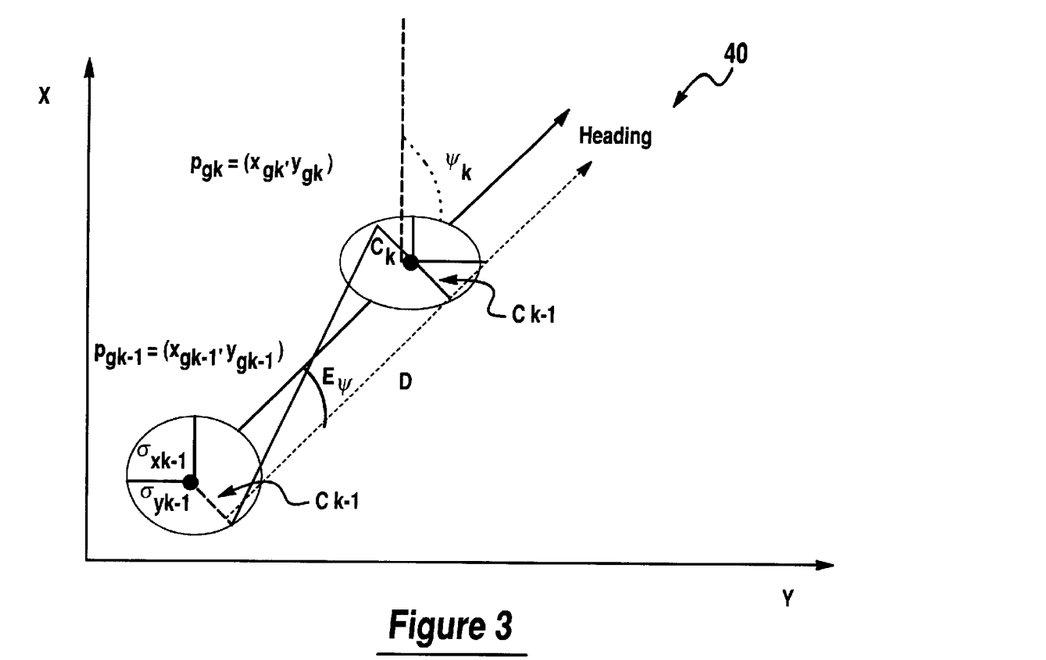
FIG. 3 is a graph illustrating the derivation of geometry-based heading angle statistics using position data.

The position covariances of the $(x_k, y_k)$ coordinate are $c_{xxk}$ and $c_{yyk}$. These covariances are available with the DGPS position solution, using $$\sigma_{xk} = \sqrt{C_{xx_k}} \qquad (Eq.\ 4)$$

$$\sigma_{yk} = \sqrt{C_{yy_k}} \qquad (Eq.\ 5)$$

Figure 5:
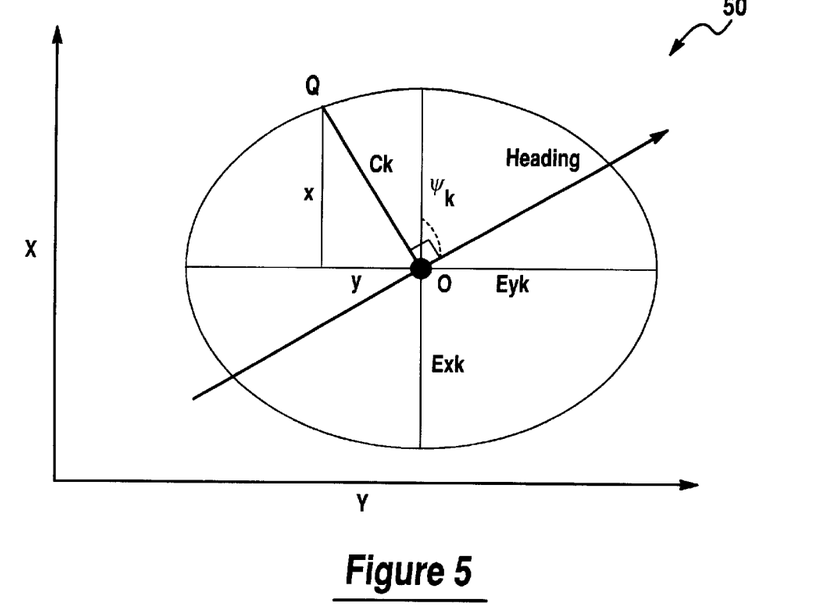
FIG. 5 is a graph illustrating the derivation of a quantity $C_k$ which is used within the equations delineated below.

From the right triangle in graph 40 of FIG. 3, the maximum magnitude of the DGPS heading angle error $E_\psi$ is equal to $$E_\psi = \operatorname{atan}\left(\frac{C_k + C_{k-1}}{D}\right) \qquad (Eq.\ 6)$$

where D is the radial distance between the k−1 and k positions. This value $E_\psi$ is to be considered the standard deviation ($\sigma$) of the DGPS heading angle error. The quantity $C_k$ in Eq. 6 can be calculated from the geometry shown in graph 50 of FIG. 5. Particularly, the equation of the heading line is $$y_h = \tan(\psi_k) x_h \qquad (Eq.\ 7)$$

Therefore, the equation of the orthogonal to the heading line is $$y_{oh} = -\frac{1}{\tan(\psi_k)} x_{oh} \qquad (Eq.\ 8)$$

and the ellipse equation is $$\frac{x^2}{C_{xx}} + \frac{y^2}{C_{yy}} = 1 \qquad (Eq.\ 9)$$

To find the coordinates of the point Q (the intersection of line OQ with the ellipse), y is equated to $y_h$ from the above equation, i.e., $$y^2 = C_{yy}\left(1 - \frac{x^2}{C_{xx}}\right) = \frac{1}{\tan^2(x)} x^2 \qquad (Eq.\ 10)$$

Thus, $$y = \sqrt{\frac{C_{xx_k} C_{yy_k}}{C_{xx_k} + C_{yy_k} \tan^2 \psi_k}} \qquad (Eq.\ 11)$$

$$x = \sqrt{\frac{C_{xx_k} C_{yy_k} \tan^2 \psi_k}{C_{xx_k} + C_{yy_k} \tan^2 \psi_k}} \qquad (Eq.\ 12)$$

and thus, the distance $C_k$ is the distance between the point Q and the point O, or $$C_k = \sqrt{\frac{C_{xx_k} C_{yy_k} = (1 + \tan^2 \psi_k)}{C_{xx_k} + C_{yy_k} \tan^2 \psi_k}} \qquad (Eq.\ 13)$$

Once a "smoothed" DGPS heading angle and its statistics are obtained, the DGPS heading angle is "combined" with the INS heading angle as shown by block 20 of module 12. A geometric approach is utilized to integrate the DGPS heading angle and the INS heading angle. Particularly, the approach is based on the difference (e.g. "distance") between the two angles and on the statistics of both angles.

Figure 4:
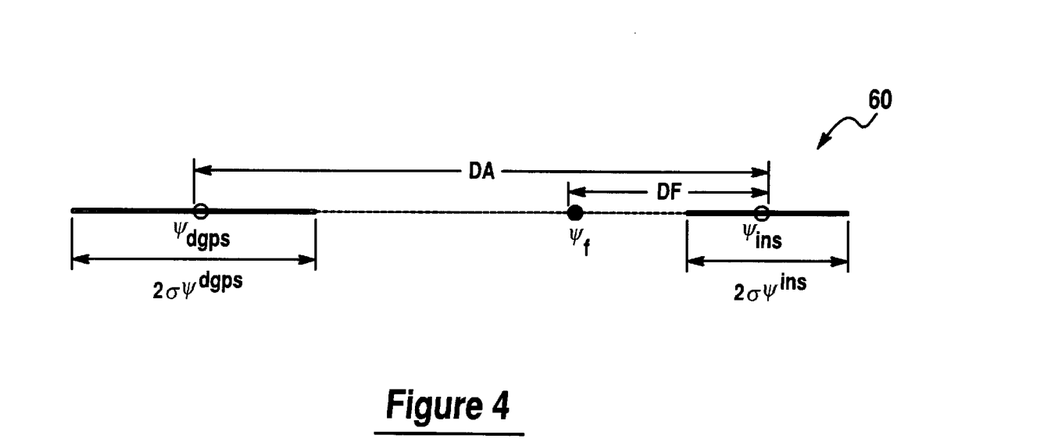
FIG. 4 is a diagram illustrating a distance "DA" which is equal to the absolute value of the difference between an INS and a DGPS heading angle.

Referring now to FIG. 4, this distance "DA" is illustrated in diagram 60. The distance DA is defined as $$DA = |\psi_{ins} - \psi_{dgps}| \qquad (Eq.\ 14)$$

If DA is greater the sum of the standard deviation "$\sigma$" values of both the INS heading angle and the DGPS heading angle, the ranges of the two angles will not overlap. In this case the combined heading angle will be equal to the weighted average of both angles. Defining the weights to be the reciprocals of the $\sigma$ values, then $$W_{ins} \equiv \frac{1}{\sigma_{\psi ins}} \qquad (Eq.\ 15)$$

$$W_{dgps} \equiv \frac{1}{\sigma_{\psi dgps}} \qquad (Eq.\ 16)$$

Therefore, the combined heading angle $\psi_f$ is equal to the weighted average of the INS heading angle and the DGPS heading angle, i.e., $$\psi_f = \frac{w_{ins} W_{ins} + w_{dgps} \psi_{dgps}}{w_{ins} + w_{dgps}} \qquad (Eq.\ 17)$$

After obtaining the desired or "combined" angle $\psi_f$ in Eq. 17, the angle is inputted into the linear neuron 14, as shown in FIG. 1 and is used to train the linear neuron 14.

To design the linear neuron 14 such that its coefficients will reflect the estimates of the bias and the scale factor, a heading error model and a desired target are determined. For the heading error model, the calculated yaw rate is assumed to be in the form $$r_c = (K_a + \delta K) V_a + B_r + n_r, \qquad (Eq.\ 18)$$

where $r_c$ is the calculated yaw rate, $K_a$ is the accurate scale factor, $\delta K$ is the error in the nominal scale factor ($K_A + \delta K$), $V_a$ (volts) is the correct direct voltage obtained from the yaw rate sensor, $B_r$ is the bias in the calculated yaw rate (rad/sec), and $n_r$ is the noise in the calculated yaw rate (rad/sec). Using the correct yaw rate $$r_a = K_a V_a \qquad (Eq.\ 19)$$

Eq. 18 can be written as $$\delta r = r_c - r_a = \delta K_r r_a + B_r + n_r, \qquad (Eq.\ 20)$$

where $\delta K_r$ is defined as $$\delta K_r = \frac{\delta K}{K_a} \quad \text{(Eq. 21)}$$

Eq. 20 is the error in one yaw rate sample, and is in terms of the correct yaw rate, which is "unknown". The equation Eq. 20 can then be written in terms of the calculated yaw rate as follows $$\delta r = \delta K_c r_c + B_{rc} + n_c, \quad \text{(Eq. 22)}$$

where $$\delta K_c = \frac{\delta K_r}{1 + \delta K_r} \quad \text{(Eq. 23)}$$

$$B_c = \frac{B_r}{1 + \delta K_r} \quad \text{(Eq. 24)}$$

$$n_c = \frac{n_r}{1 + \delta K_r} \quad \text{(Eq. 25)}$$

To develop the total error added to the heading angle between the k−1 and k DGPS samples ($\Delta_{\psi k-1,k}$), the following definition is made $$L \equiv \frac{dt_g}{dt_i} \quad \text{(Eq. 26)}$$

and then $\Delta_{\psi k-1,k}$ will be the discrete integration of the L error samples, i.e., $$\Delta_{\psi k-1,k} = \delta r_1 dt_1 + \delta r_2 dt_i + \ldots + \delta r_L dt_i = \delta K_{CK}(r_{c1} + r_{c2} + \ldots + r_{cL}) dt_1 + B_{ck} L dt_i +$$

$$(n_{c1} + n_{c2} + \ldots n_{cL}) dt_i = S_{rk-1,k} \delta k_{ck} dt_i + B_{ck} dt_g + S_{nk-1,k} dt_i \quad \text{(Eq. 27)}$$

$S_{rk-1,k}$ and $S_{nk-1,k}$ in Eq. 27 are the respective sum of the yaw rate measurements and noises between the last and the current DGPS points, and $dt_g$ is equal to $Ldt_i$. In one non-limiting embodiment, the discreet integration is performed by subroutine 22. The error in the heading angle at time k ($\psi_{Ek}$) can, therefore, be written as $$\psi_{Ek} = \psi_{E0} + (\delta K_{c1} S_{r0,1} + \ldots \delta K_{ck} S_{rk-1,k}) dt_{1+} (B_{c1} + \ldots + B_{ck}) dt_g + S_{E0,k} dt_i \text{ (Eq. 28)}$$

Under the assumption that the scale factor and the bias are constant for a period of time T between an m (m<k) sample and the current sample k (e.g., $T_{dgps}$), Eq. 28 can be written as $$\psi_{Ek} = \psi_{Em} + \delta K_{cmk} S_{rm,k} dt_i + B_{cmk1} T + S_{n0,k} dt_i \quad \text{(Eq. 29)}$$

If this assumption does not hold, the scale factor and the bias in Eq. 29 are set equal to the weighted average scale factor and the average bias, respectively, over the time period T.

In the preferred embodiment of the invention, the design of the linear neuron is based on Eq. 29 and may be affected by several different factors. For example and without limitation, the quality of the yaw rate sensor may affect the neuron design (e.g., the higher the quality of the yaw rate sensor, the bigger the selected value of T). This allows a sufficient amount of error to accumulate between the k−1 and k DGPS samples. These factors can be adjusted and/or modified by a designer by use of model generator portion 24 of module 12.

Since the goal of this system 10 is to estimate features (i.e., scale factor and bias), the open loop INS heading angle $\psi_{ins}$ is used as the angle with the accumulated error. This causes the estimator to be less affected by the quality of the combined heading angle (desired target) in Eq. 17.

Figure 6:
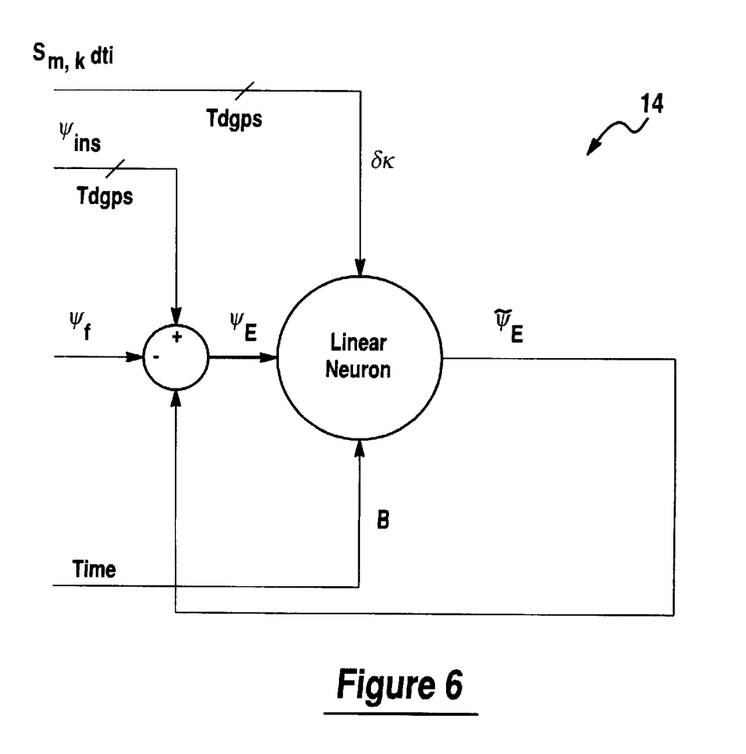
FIG. 6 is a block diagram illustrating one embodiment of a linear neuron design used by the system shown in FIG. 1.

Referring now to FIG. 6, there is shown one non-limiting design of the linear neuron 14. The desired target is the open loop INS heading angle $\psi_{ins}$ minus the combined heading angle $\psi_f$ in Eq. 17 which represents the error in the open loop heading angle. The neuron design is simply a simulation of Eq. 29, where the neuron weights are the estimated scale factor $\delta K$ and bias B, and the neuron inputs are the yaw rate sum and time. A bias input of value one is needed if T is the time calculated from zero. This is necessary to estimate the initial error in the heading angle. If the noise is zero mean, it will be smoothed out by a summing operation. The designer can "inject" the neuron with a noise level that matches what is in the yaw rate sensor specification sheet. The estimated scale factor and bias is fed back into module 12 in order to predict the error of the INS heading angle for the next DGPS period.

The present invention dynamically integrates DGPS and INS by use of a linear neuron, thereby effectively and automatically eliminating errors in vehicle heading and speed measurements. The system 10 utilizes linear neuron 14 to adaptively estimate scale factor and the bias values during the availability of the GPS, and then uses these estimated values to aid the INS during periods of time in which the GPS is unavailable or unsuitable for use. The linear neuron used by the present system and method avoids parameter identification disadvantages and extensive training requirements inherent in neural networks. The present system and method further reduce problems associated with persistent excitation inherent in prior "Kalman" filter type estimations.

Experimental results of the present system 10 demonstrate the advantages of the present system over the Kalman filter method in terms of estimation, efficiency and computation time. The graphs 70–110 of FIGS. 7–11 contain experimental data which was obtained over a segment of highway which included straight sections, curved sections, and overhead bridges. The overhead bridges were effective to block the satellite signals and make the DGPS unavailable while the vehicle was underneath the bridges.

Figure 7:
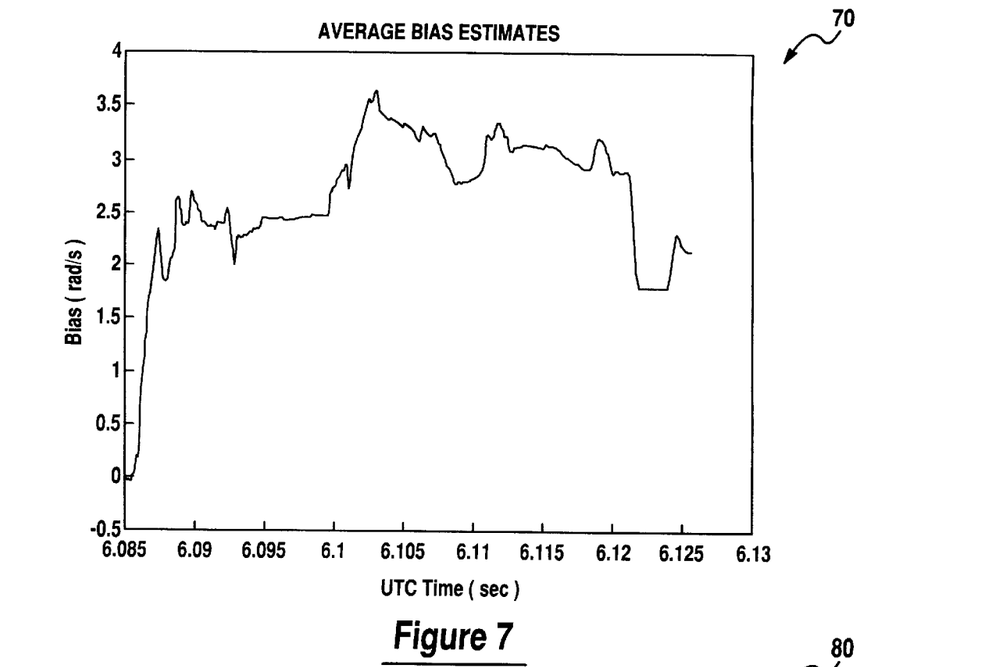
FIG. 7. is a graph illustrating the average bias estimates provided by the system shown in FIG. 1 over a period of time.
Figure 8:
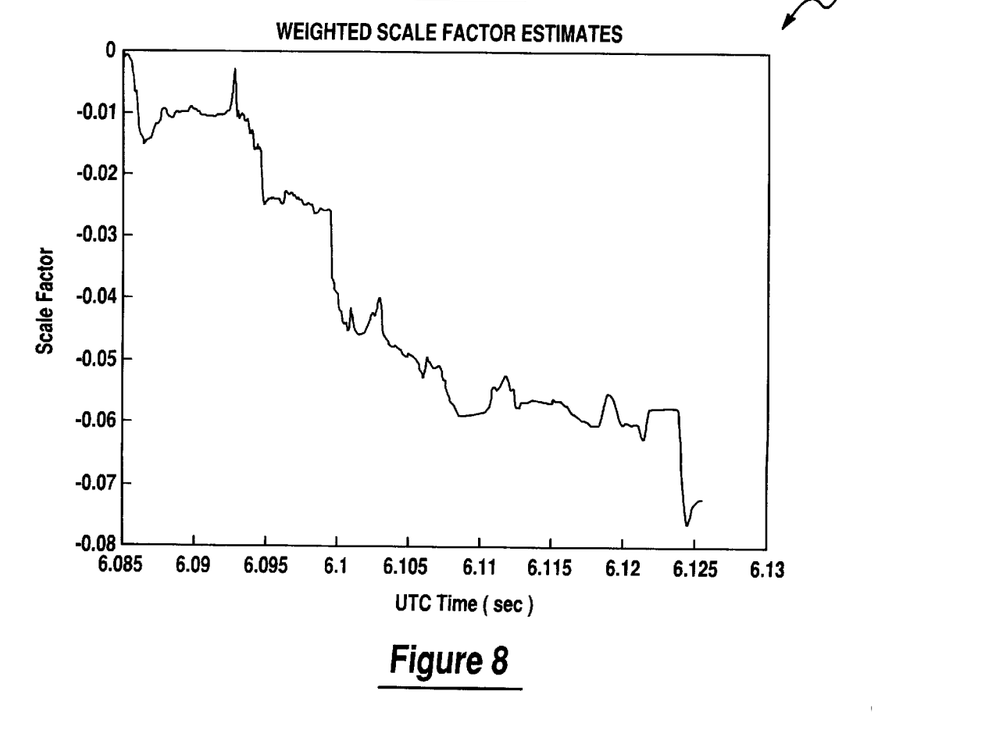
FIG. 8 is a graph illustrating the weighted scale factor estimates provided by the system shown in FIG. 1 over a period of time.

Referring now to FIGS. 7 and 8, there are respectively shown a graph 70 illustrating the average bias estimate provided by system 10 over a period of time, and a graph 80 illustrating the weighted scale factor estimates provided by system 10 over a period of time. The average bias estimates shown in graph 70 are equal to the remaining bias after subtracting the "turn on" bias.

Figure 9:
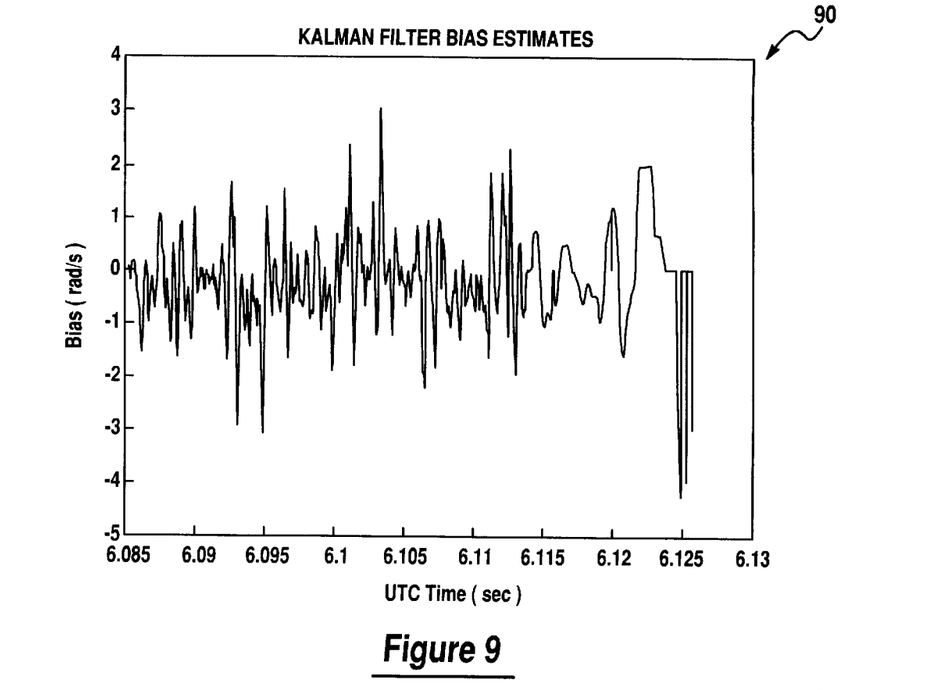
FIG. 9 is a graph illustrating the average bias estimates provided by a Kalman filter type system over a period of time.
Figure 10:
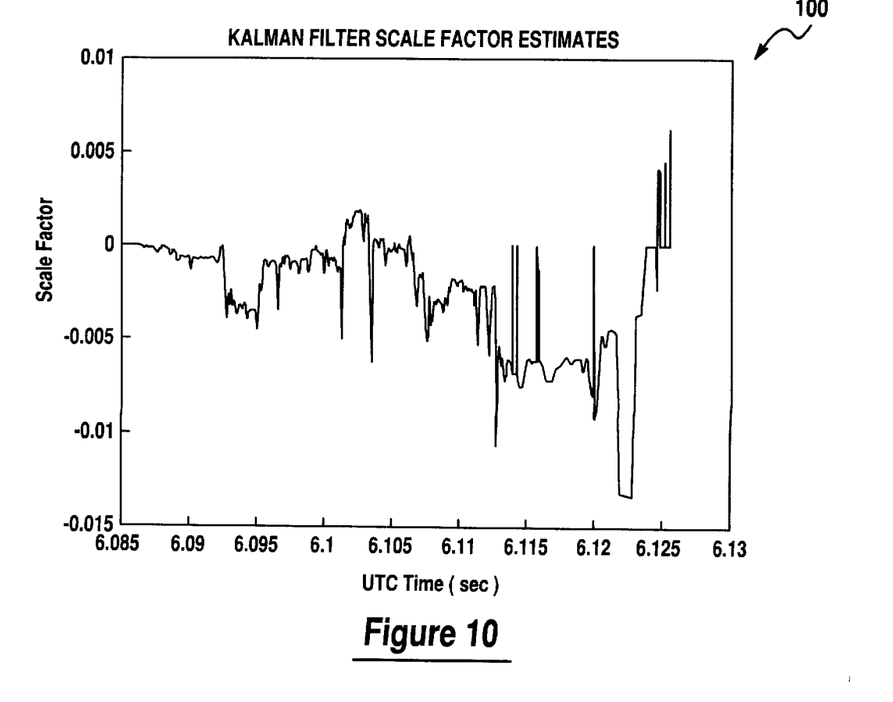
FIG. 10 is a graph illustrating the scale factor estimates provided by a Kalman filter type system over a period of time.

Referring now to FIGS. 9 and 10, there are respectively shown a graph 90 illustrating the average bias estimate provided by a system utilizing a "Kalman" filter, and a graph 100 illustrating the scale factor estimates provided by a system utilizing a "Kalman" filter. As should be appreciated by one of ordinary skill in the art, unlike system 10, the "Kalman" filter system shown in graphs 90 and 100 is unable to correctly estimate both the bias and the scale factor.

Figure 11:
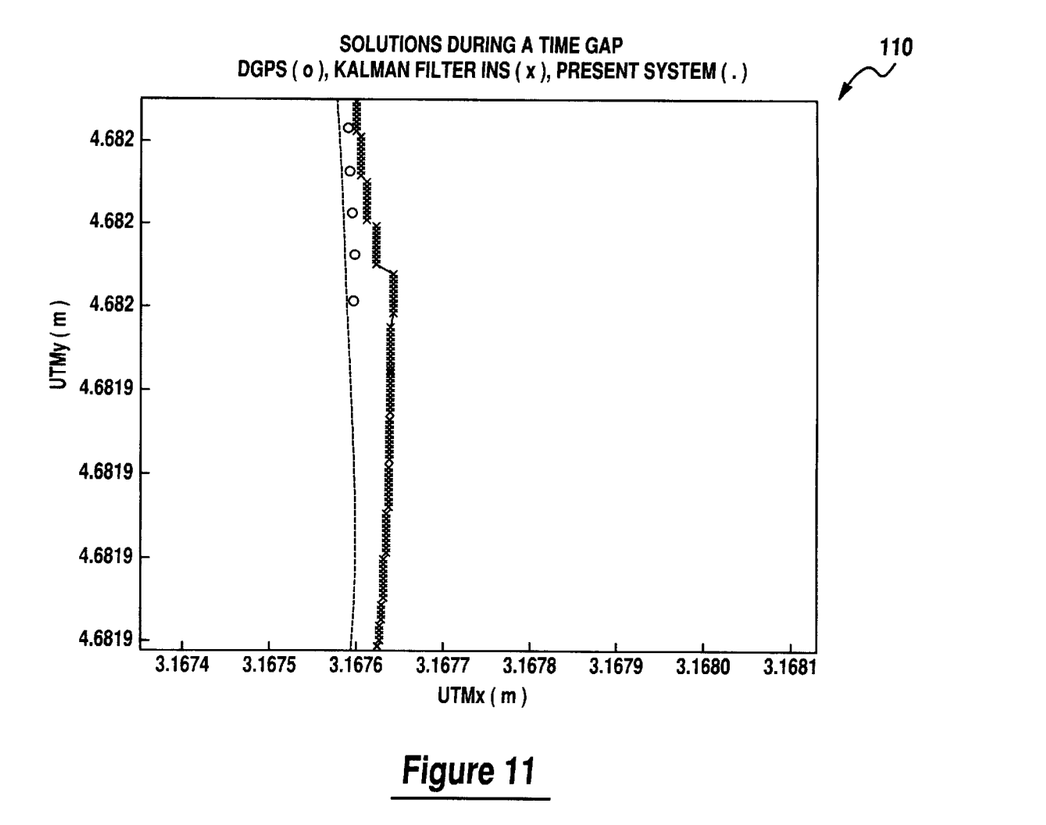
FIG. 11 is a graph illustrating the "gap-filling" function of the system shown in FIG. 1 in comparison to the "gap-filling" function provided by a Kalman filter type system.

Referring now to FIG. 11, there is shown a graph 110 which illustrates the "gap-filling" function of the present system 10 in comparison to the "gap-filling" function provided by a Kalman filter type system. Particularly, graph 100 illustrates the performance of the present system 10 and a Kalman filter type system during and after a "gap" (e.g., a period of time where DGPS is unavailable) which is induced by an typical overhead bridge. As shown by graph 100, at the exit of the gap, the lateral distance between the present system 10 and the Kalman filter type system is approximately 5.5 meters. The present system and the Kalman filter type system are, respectively, 0.5 meters and 5 meters away from the DGPS solution. Additionally, the Kalman filter solution is "pulled" toward the DGPS solution by about 2 meters.

It is understood that the various inventions are not limited to the exact construction and method illustrated and described above, but that these previously delineated inventions may be varied without departing from the scope of the inventions as described in the following claims.

What is claimed is:

1. A system for estimating errors in a first sensor, said system comprising:
    a module which is communicatively coupled to said first sensor and to a second sensor, and which includes a first portion which selectively generates a first value based upon a signal received from said first sensor, a second portion which selectively generates a second value based upon a signal from said second sensor, and a third portion which combines said first and second value, effective to generate a third value; and
    a linear neuron which is communicatively coupled to said module and which receives said first value and said third value, and which estimates said errors within said first sensor based upon said received first and third values.

2. The system of claim 1 wherein said first sensor comprises a yaw rate sensor.

3. The system of claim 2 wherein said second sensor comprises a global position system sensor.

4. The system of claim 3 wherein said first and second values comprise vehicle heading angle values.

5. The system of claim 4 wherein said errors comprise a scale factor error and a sensor bias error.

6. The system of claim 1 wherein said module is further effective to smooth said second value prior to combining it with said first value.

7. The system of claim 6 wherein said module is further effective to generate statistics related to said first and second values and to combine said first and second value based upon said generate statistics.

8. The system of claim 7 wherein said linear neuron is further effective to communicate said errors to said module which utilizes said errors to generate said statistics.

9. A system for estimating a scale factor and bias error of a yaw rate sensor which is used within an integrated navigation system having a global position system sensor, said system comprising:
    a first portion which receives a first signal from said global position system sensor and calculates a global position system heading angle based upon said first signal;
    a second portion which receives an integrated navigation system heading angle;
    a third portion which combines said global position system heading angle and said integrated navigation system heading angle, effective to generate a combined heading angle; and
    a linear neuron which is communicatively coupled to said third portion, which receives said integrated navigation system heading angle and said combined heading angle and which is effective to accurately estimate said scale factor and said bias error based upon said received integrated navigation system heading angle and combined heading angle.

10. The system of claim 9 further comprising:
    a fourth portion which is effective to generate first statistics relating to said global position system heading angle; and
    wherein said third portion receives said first statistics and combines said global position system heading angle and said integrated navigation system heading angle, based upon said received first statistics.

11. The system of claim 10 wherein said linear neuron communicates said scale factor and bias error to said fourth portion which generates second statistics relating to said integrated navigation system heading angle; and
    wherein said third portion further receives said second statistics and combines said global position system heading angle and said integrated navigation system heading angle, further based upon said received second statistics.

12. The system of claim 11 wherein said first portion is further effective to smooth said global position system heading angle.

13. A method for estimating scale factor and bias of a first sensor which measures a certain attribute and generates a first signal based upon said measured attribute, said method comprising the steps of:
    providing a second sensor which measures said attribute and generates a second signal based upon said measured attribute;
    selectively generating a first value based upon said first signal;
    selectively generating a second value based upon said second signal;
    combining said first and second value, effective to generate a third value;
    providing a linear neuron;
    communicating said first value and said third value to said linear neuron; and
    utilizing said linear neuron to estimate said scale factor and bias of said first sensor based upon said received first and third values.

14. The method of claim 13 wherein said first sensor comprises a yaw rate sensor.

15. The method of claim 14 wherein said second sensor comprises a global position system sensor.

16. The method of claim wherein said first and second values comprise vehicle heading angle values.

17. The method of claim 16 further comprising the steps of:
    generating certain statistics related to said first and second values; and
    utilizing said certain statistics to combine said first and second value.

18. The method of claim 17 further comprising the step of:
    smoothing said second value prior to combining it with said first value.

19. The method of claim 18 further comprising the step of:
    utilizing said estimated scale factor and bias to generate said certain statistics.

* * * * *